United States Patent Office 3,492,290
Patented Jan. 27, 1970

3,492,290
PROCESS FOR THE PREPARATION OF 5-PHEN-
YL - 3H - 1,4 - BENZODIAZEPINES AND NOVEL
INTERMEDIATES
George Francis Field, West Caldwell, and Leo Henryk
Sternbach, Upper Montclair, N.J., assignors to Hoffmann-La Roche Inc., Nutley, N.J., a corporation of New Jersey
No Drawing. Filed Dec. 15, 1966, Ser. No. 601,838
Int. Cl. C07d 53/06
U.S. Cl. 260—239          9 Claims Process for the preparation of 5-phenyl-3H-1,4-benzodiazepines and novel intermediates This invention relates to a novel process for the preparation of known pharmaceutically useful benzodiazepines and to novel intermediates useful therein. More particularly, this invention relates to a novel synthetic route in the preparation of the pharmaceutically valuable product chlordiazepoxide.

The novel process of this invention can be readily traced with respect to the following schematic diagram:

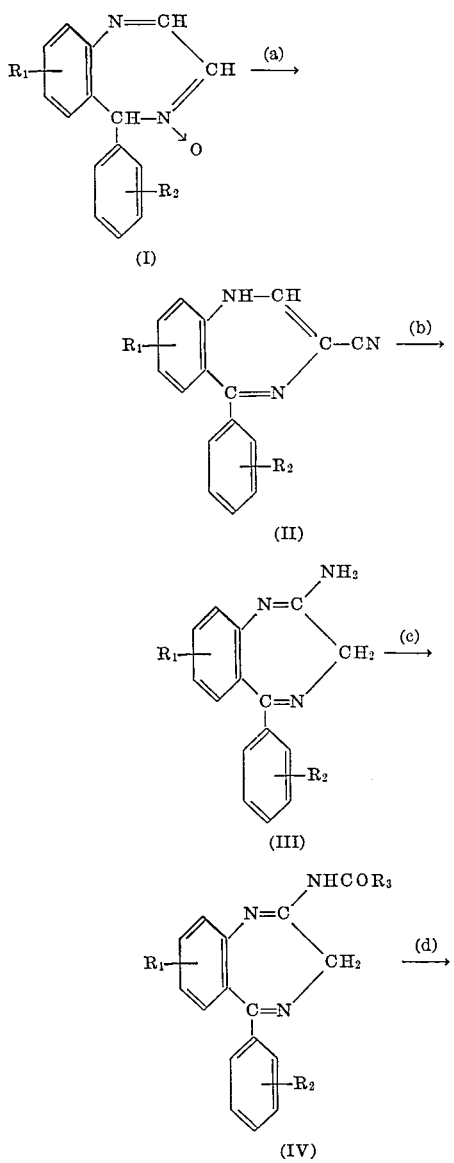

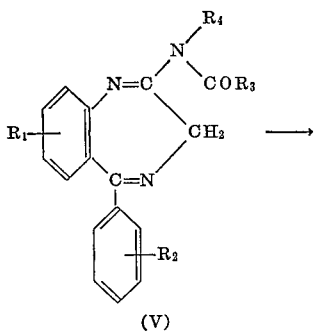

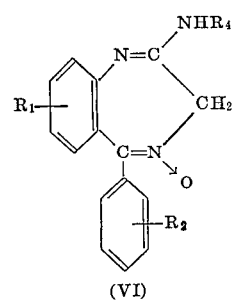

wherein $R_1$ and $R_2$ are each independently selected from the group consisting of hydrogen, halogen, trifluoromethyl, cyano and nitro and when $R_1$ is other than hydrogen, it is preferably attached to the benzodiazepine nucleus at the 7-position; $R_3$ is lower alkyl, phenyl or benzyl; and $R_4$ is lower alkyl.

In its particular process aspect this invention relates to the formation of the novel intermediates of Formula II and their rearrangement to the 2-amino-5-phenyl-3H-1,4-benzodiazepine intermediates of Formula III designated as steps (a) and (b) in the schematic diagram above. The 5 - phenyl - 1H-1,4-benzodiazepine-3-carbonitriles of Formula II are, as stated above, novel compounds which also constitute a part of this invention. The 5-phenyl-5H-1,4-benzodiazepine 4-oxide starting materials of Formula I are known compounds or analogs of known compounds, which can be prepared by analogy to the preparation of known starting materials. The conversion of 5-phenyl-5H-1,4-benzodiazepine 4-oxides of Formula I to the novel carbonitrile intermediates of Formula II is readily accomplished by treating the starting material with an alkali metal cyanide, such as sodium cyanide, potassium cyanide, and the like. The carbonitrile product of Formula II is isolated from the reaction mixture by treating with any suitable acid to neutralize the excess base and separating the product by any of the usual techniques, e.g., filtration, evaporation, etc. The reaction is conveniently carried out in the presence of an inert organic solvent, preferably a solvent which will dissolve the cyanide reactant such as lower alkanols, e.g., methanol, ethanol, and the like.

It is preferred to operate at a reduced temperature, preferably at a temperature between about 0° C. and room temperature, though temperatures up to about 50° C. or higher can be employed, if desired.

The novel carbonitrile intermediates of Formula II are readily converted to the 2-aminobenzodiazepines of Formula III by treatment with alkali. This reaction can be effected with any of the usual bases, though a strong base such as sodium hydroxide, potassium hydroxide, and the like, is preferred. The reaction is conveniently carried out in the presence of a water-miscible organic solvent such as an alcohol, e.g., methanol, ethanol, and the like, and is preferably done at an elevated temperature, suitably at a temperature between about room temperature and the reflux temperature of the reaction mixture.

The 2-aminobenzodiazepine intermediates of Formula III can be readily acylated by any of the usual techniques such as treatment with an alkanoic acid anhydride, e.g., acetic anhydride, to give the N-acylamino derivatives of Formula IV, which upon alkylation by the usual techniques for alkylating, for example, treatment with an alkyl halide gives the known benzodiazepines of Formula V which can in turn be converted to the pharmaceutically useful benzodiazepine-N-oxides of Formula VI by oxidation and hydrolysis according to known procedures.

The benzodiazepine intermediates of Formulae III, IV and V are also pharmaceutically valuable compounds. They are, for example, disclosed in U.S. Patent No. 3,177,201 for use as sedatives, muscle relaxants, or anticonvulsants.

This invention will be more fully understood from the detailed examples which follow. These examples are intended to illustrate the invention and are not to be construed to be limitative thereof.

EXAMPLE 1

A mixture of 13.5 g. (50 mmole) of 7-chloro-5-phenyl-5H-1,4-benzodiazepine 4-oxide and 100 ml. of methanol was cooled in an ice bath. To the cooled mixture was added 2.5 g. (51 mmoles) of sodium cyanide. After the mixture had stirred 10 minutes, 3 ml. of acetic acid was added. After the mixture had stirred for a further 30 minutes, the solid was collected and washed with methanol to give 7-chloro-5-phenyl-1H-1,4-benzodiazepine-3-carbonitrile, M.P. 205–208°. Recrystallization from methanol gave dark red prisms, M.P. 211–213°.

EXAMPLE 2

To a refluxing mixture 2.8 g. (10 mmoles) of 7-chloro-5-phenyl-1H-1,4-benzodiazepine-3-carbonitrile in 50 ml. of methanol was added 3 ml. of 3 N sodium hydroxide. After 25 minutes, 6 ml. more of 3 N sodium hydroxide was added, and heating continued for 35 minutes. The reaction mixture was kept in the refrigerator overnight and the product, having an M.P. of 238–247° (dec.) was collected. Recrystallization from aqueous methanol and from acetone gave 2-amino-7-chloro-5-phenyl-3H-1,4-benzodiazepine, M.P. 236–240° undepressed on addition of authentic material.

EXAMPLE 3

To a suspension of 1.7 g. (6.3 mmoles) of 2-amino-7-chloro-5-phenyl-3H-1,4-benzodiazepine in 10 ml. of pyridine was added 10 ml. of acetic anhydride. This mixture was stirred briefly to effect solution, allowed to stand 18 hours at room temperature, then concentrated in vacuo. The crysalline residue was collected and washed with ether to give 2-acetamido-7-chloro-5-phenyl-3H-1,4-benzo diazepine, M.P. 193–197° (dec.). Recrystallization from ethyl acetate gave colorless needles, M.P. 200-204° (dec.).

EXAMPLE 4

A solution of 1.5 g. (4.8 mmoles) of 2-acetamido-7-chloro-5-phenyl-3H-1,4-benzodiazepine in 50 ml. of dimethylformamide, which had been dried by distillation of 20 ml. of benzene from it, was treated with 365 mg. (ca. 7.6 mmoles) of a 50 percent dispersion of sodium hydride in oil. This mixture was stirred for 10 minutes at room temperature and 0.5 ml. (ca. 8 mmoles) of methyl iodide was added. After this mixture had stirred for 3 hours, it was diluted with 200 ml. of ice water and extracted with 3×100 ml. of methylene chloride. The methylene chloride extracts were combined, washed with 2×100 ml. of water and dried over sodium sulfate. The residue left on removal of the methylene chloride in vacuo was diluted with 250 ml. of water and extracted with 250 ml. of cyclohexane. The residue (2.1 g.) left on removal of the cyclohexane in vacuo was crystallized from hexane/ether to give 7-chloro-2-(N-methylacetamido)-5-phenyl-3H-1,4-benzodiazepine, M.P. 140–150°. Two recrystallizations (charcoal) raised the M.P. to 155–160° undepressed on admixture of authentic material, M.P. 160–164°. The infrared spectrum and thin layer chromatographic behavior were identical to those of authentic material.

EXAMPLE 5

Peracetic acid was prepared by the dropwise addition of 3.35 g. of acetic anhydride to a stirred cold suspension (ice bath) of 0.75 ml. of 90 percent hydrogen peroxide and one drop of concentrated sulfuric acid in 3 ml. of methylene chloride. After stirring for 15 minutes at 0°, the solution was left at 25° for 30 minutes. The solution was then added dropwise, with stirring, to an ice cold solution of 3.0 g. (0.0092 mmole) of 7-chloro-2-(N-methylacetamido) - 5-phenyl-3H-1,4-benzodiazepine in methylene chloride. The so-formed mixture was kept at 25° overnight, washed with water and dilute aqueous ammonia and then concentrated after drying over sodium sulfate. Crude 7-chloro-2-(N-methylacetamido)-5-phenyl-3H-1,4-benzodiazepine 4-oxide was obtained. The so-formed crude product was placed on a column containing 90 grams of aluminum oxide (Woelm, basic, grade 1). Elution with ethyl acetate gave white prisms melting at 233–237°. After recrystallization from a mixture of methylene chloride and ether, 7-chloro-2-methylamino-5-phenyl-3H-1,4-benzodiazepine 4-oxide was obtained as crystals melting at 235–237°.

What is claimed is:

1. A process for the preparation of a benzodiazepine 3-carbonitrile of the formula:

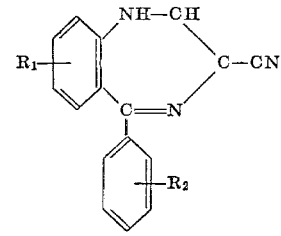

wherein $R_1$ and $R_2$ are each independently selected from the group consisting of hydrogen, halogen, trifluoromethyl, cyano and nitro which comprises treating a 5-phenyl-5H-1,4-benzodiazepine 4-oxide of the formula:

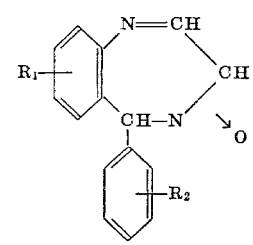

wherein $R_1$ and $R_2$ are as defined above with an alkali metal cyanide.

2. The process according to claim 1 wherein 7-chloro-5-phenyl-1H-1,4-benzodiazepine - 3 - carbonitrile is obtained by treating 7-chloro-5-phenyl-5H-1,4-benzodiazepine 4-oxide with an alkali metal cyanide.

3. The process according to claim 2 wherein the alkali metal cyanide employed is sodium cyanide.

4. A process according to claim 1 where in a next step, the benzodiaxepine-3-carbonitrile product is treated with an alkali to form a 2-amidobenzodiazepine of the formula:

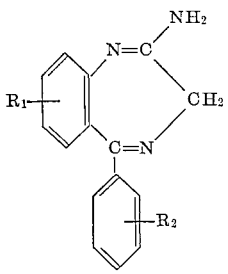

wherein $R_1$ and $R_2$ are each independently selected from the group consisting of hydrogen, halogen, trifluoromethyl, cyano and nitro.

5. A process according to claim 4 wherein the 2-amidobenzodiazepine product is successively acylated and alkylated to form a compound of the formula:

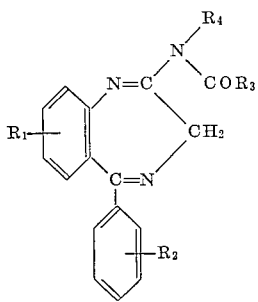

wherein $R_1$ and $R_2$ are each independently selected from the group consisting of hydrogen, halogen, trifluoromethyl, cyano and nitro; $R_3$ is lower alkyl, phenyl or benzyl; and $R_4$ is lower alkyl.

6. A process for the preparation of a compound of the formula:

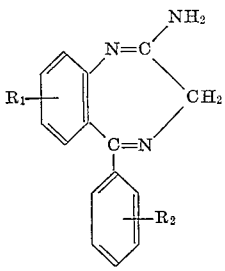

wherein $R_1$ and $R_2$ are each independently selected from the group consisting of hydrogen, halogen, trifluoromethyl, cyano and nitro which comprises treating a compound of the formula:

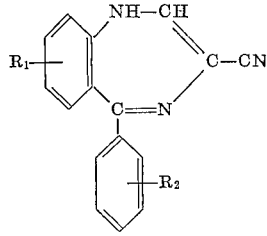

wherein $R_1$ and $R_2$ are as defined above with alkali.

7. The process according to claim 6 wherein 7-chloro-5-phenyl-1H-1,4-benzodiazepine-3-carbonitrile is treated with an alkali to form 2-amido-7-chloro-5-phenyl-3H-1,4-benzodiazepine.

8. A compound of the formula:

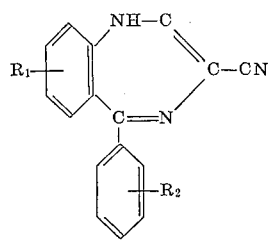

wherein $R_1$ and $R_2$ are each independently selected from the group consisting of hydrogen, halogen, trifluoromethyl, cyano and nitro.

9. The compound according to claim 8 wherein $R_1$ is chloro and is in the 7-position and $R_2$ is hydrogen, i.e., the compound 7-chloro-5-phenyl-1H-1,4-benzodiazepine-3-carbonitrile.

References Cited

UNITED STATES PATENTS 2,893,992   7/1959   Sternbach _____ 260—239

ALTON D. ROLLINS, Primary Examiner

PO-1050
(5/69)

UNITED STATES PATENT OFFICE
CERTIFICATE OF CORRECTION

Patent No. 3,492,290                Dated January 27, 1970

Inventor(s) George Francis Field and Leo Henryk Sternbach

It is certified that error appears in the above-identified patent and that said Letters Patent are hereby corrected as shown below:

Column 4, lines 35-45

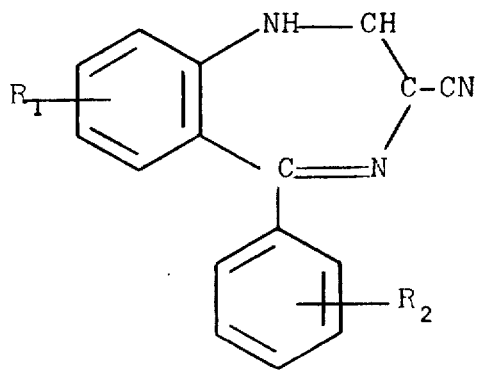

should be

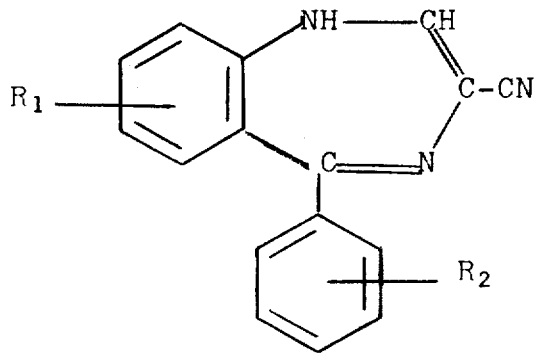

Page 8, line 3 of our specification.

PO-1050
(5/69)

UNITED STATES PATENT OFFICE
CERTIFICATE OF CORRECTION

Page 2

Patent No. 3,492,290       Dated January 27, 1970

Inventor(s) George Francis Field and Leo Henryk Sternbach

It is certified that error appears in the above-identified patent and that said Letters Patent are hereby corrected as shown below:

Column 4, lines 52 to 65

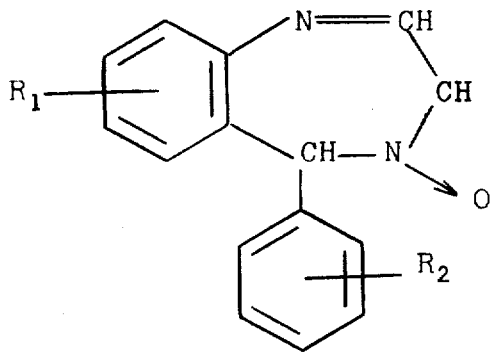

should be

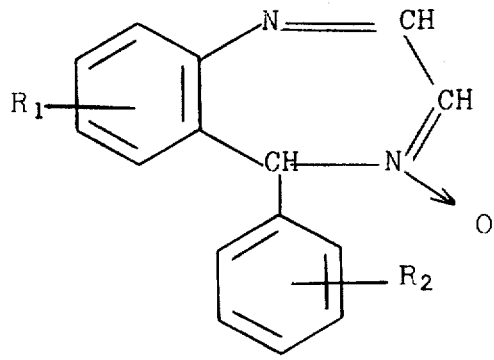

Page 8, line 9 of our specification.

(SEAL)
Attest:

SIGNED AND
SEALED
NOV 17 1970

Edward M. Fletcher, Jr.
Attesting Officer

WILLIAM E. SCHUYLER, JR.
Commissioner of Patents